United States Patent [19]
Rogers

[11] 3,830,368
[45] Aug. 20, 1974

[54] LIQUID FILTER

[76] Inventor: Kenneth L. Rogers, 404 Center St., Rt. 1, Box 35, Boscobel, Wis. 53805

[22] Filed: Jan. 10, 1973

[21] Appl. No.: 322,310

[52] U.S. Cl. ................. 210/94, 210/131, 210/136, 210/429
[51] Int. Cl. ............................................. B01d 35/00
[58] Field of Search ....... 210/94, 95, 130, 131, 136, 210/232, 419, 429, 443, 444, 450

[56] References Cited
UNITED STATES PATENTS

| | | | |
|---|---|---|---|
| 2,047,266 | 7/1936 | Hill | 210/94 |
| 2,905,323 | 9/1959 | Megesi | 210/130 |
| 3,043,432 | 7/1962 | Megesi | 210/130 X |
| 3,244,282 | 4/1966 | Rosaen | 210/131 X |
| 3,388,800 | 6/1968 | MacGregor | 210/131 |
| 3,467,256 | 9/1969 | Humbert, Jr. et al. | 210/136 X |
| 3,471,019 | 10/1969 | Trasen et al. | 210/94 |

Primary Examiner—Samih N. Zaharna
Assistant Examiner—Robert H. Spitzer
Attorney, Agent, or Firm—Theodore J. Long; John M. Winter

[57] ABSTRACT

A liquid filter assembly having a filter element slidably mounted within a container for filtering impurities from liquids. The lower portion of the container below the filter element is of sufficient volume to permit condensation and separation of heavier liquid and solid impurities from the liquid before filtration. A normally closed bypass tube is movable by said filter element in response to a predetermined fluid pressure differential across said filter element resulting from the accumulation of impurities therein to a bypass position which permits liquid to bypass the clogged filter and be discharged from the filter assembly through the bypass tube and outlet pipe.

8 Claims, 1 Drawing Figure

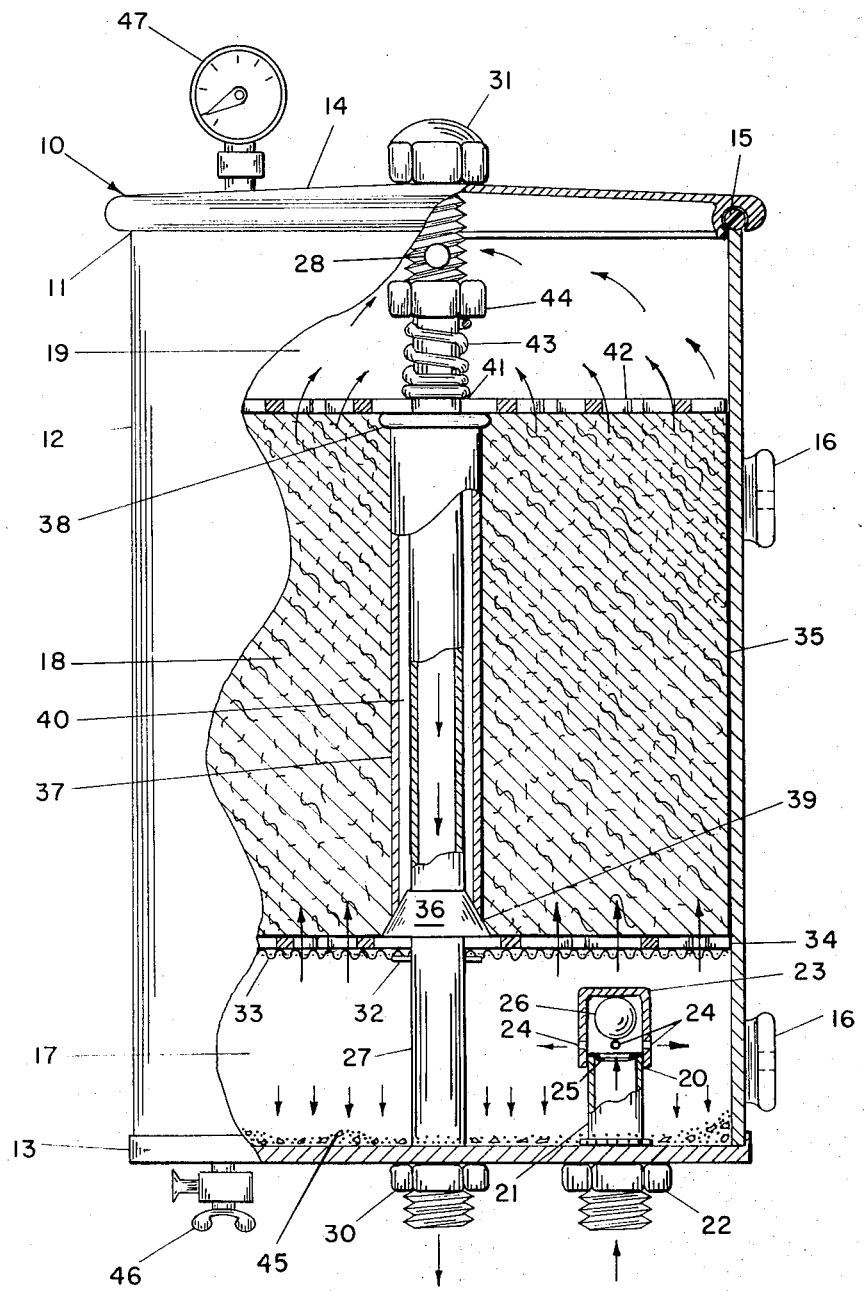

LIQUID FILTER

BACKGROUND OF THE INVENTION

1. FIELD OF THE INVENTION

This invention pertains generally to a filter assembly for removing impurities from liquids, and more particularly to a filter assembly which will effectively filter impurities from liquid and will provide for bypass of the filter element in the event the filter element becomes substantially clogged with impurities.

2. DESCRIPTION OF THE PRIOR ART

Filters of various types have been commonly used to filter impurities from liquids, particularly with respect to liquid fuels and lubricants employed in internal combustion engines. Filters are commonly employed in an attempt to remove impurities such as water and foreign solids from such fuels and lubricants prior to or during use in engines. Such previous filters have generally employed a filter element of paper, fiber or other suitable material through which the liquid to be filtered is passed for the purpose of removing impurities. The impurities which are filtered out of the liquid are retained within the filter element, and the filter element is eventually replaced and disposed of on a periodic basis.

Problems frequently arise from failure of the operator to replace such a filter element before it has become clogged with impurities which prevent the filter from operating properly. If the liquid being filtered contains an abnormal amount of impurities or if the operator does not observe a regular schedule for replacement of the filter element, the filter may become clogged to the extent that it is not effective or it reduces the flow of filtered liquid drawn through the filter. This can be an especially acute problem where the filter is installed in the fuel line of a motor vehicle. Interruption or strangulation of the fuel flow under conditions requiring maximum response and power may present a critical safety hazard contributing to the loss of life and property.

SUMMARY OF THE INVENTION

My new and improved liquid filter assembly includes a container having a lower portion which functions as a condensing and settling zone, a mid-portion which functions as a filter and bypass zone, and an upper portion which functions as a discharge zone. The liquid to be filtered is supplied to the lower portion of the container through an inlet assembly which includes a distributor element for dispersing the liquid within the lower condensing and settling zone with low turbulence, and a check valve which prevents the liquid from back-flowing out of the container through the inlet assembly. A perforated condensing plate defines the upper limit of the condensing zone. Heavier liquid impurities entrained in the incoming primary liquid tend to separate therefrom below the condensing plate and join together to form larger liquid masses. The volume of the lower condensing and settling zone is sufficient to maintain the turbulence and currents within the zone at a relatively low level, thus permitting the heavier liquid impurities to gravitate toward the bottom of the zone, together with foreign solids which are also heavier than the primary liquid. The lower portion of the condensing and settling zone is substantially quiescent to allow the liquid and solid impurities which have settled out to remain at the bottom of the container in relatively undisturbed condition.

Following primary purification in the lower condensing and settling zone, the liquid is drawn upwardly through a filter element disposed in the mid-portion of the container in slidable relation. The filter element separates the smaller suspended impurities which have not previously settled out by gravity from the liquid. Thereafter the filtered liquid passes through a perforated pressure plate engaging the upper surface of the filter element into the upper portion of the container where it exits through a primary outlet hole into an outlet pipe for discharge from the filter apparatus.

A bypass tube encompasses the outlet pipe to define an annular bypass passage which communicates with a bypass hole in the outlet pipe in the mid-portion of the container. The bypass tube is biased downwardly by the pressure plate assembly against a lower bypass seat under normal operating conditions to prevent the flow of unfiltered liquid through the bypass passage. In the event that the filter element becomes clogged with impurities filtered from the liquid before it is replaced, the operating vacuum in the upper portion of the container will increase to draw the filter element upwardly against the resistance of the spring biased pressure plate assembly, thereby lifting the engaged bypass tube off the bypass seat and permitting unfiltered liquid to flow upwardly through the bypass passage and bypass outlet hole in the outlet pipe for discharge from the filter assembly.

It is an object of the present invention to provide an improved filter assembly for removing liquid and solid impurities from a liquid.

It is a further object of the present invention to provide an improved filter assembly which will condense and separate heavier liquids and solid impurities from a primary liquid before filtration of the liquid, and which will provide an automatic bypass of the filter element in the event the filter element becomes clogged with impurities.

Other objects, features and advantages of my invention will be apparent from the following detailed drawing wherein a preferred embodiment of the invention has been selected for exemplification.

BRIEF DESCRIPTION OF THE DRAWING

The drawing is a side elevation view of a filter assembly exemplifying my invention, with a portion of the outside container cut away to reveal the inside components which are shown partly in section.

DESCRIPTION OF THE PREFERRED EMBODIMENT

Referring now more particularly to the drawing, wherein like numerals refer to like parts throughout the several views, my improved filter assembly is shown generally at 10 in the drawing. The illustrated embodiment of my filter element is designed for and will be described with respect to use in the fuel line of a diesel engine for removing impurities from the fuel oil being supplied to the fuel injectors of the engine. However, the structure and principles employed in the illustrated embodiment are applicable for use with all liquids requiring filtration.

My improved filter assembly 10 employs a container 11 having a closed cylindrical side wall 12, a closed bottom end 13 and a removable cover 14. A sealing O- ring 15 is engaged between the side wall 12 and the cover 14 in fluid-tight relation. One or more support brackets 16 of any suitable design may be employed to support the container in the desired upright position.

Fuel oil is supplied to the lower portion 17 of the container through an inlet assembly 20. The inlet assembly 20 comprises an inlet pipe 21 secured to the bottom end 13 of the container by retaining nut 22, distributor head 23, check valve seat 25 and ball check 26. Negative pressure within the container 11 raises the ball check 26 off the check valve seat 25 to permit the fuel oil to flow through the transverse distributor holes 24 of the distributor head 23.

The upper limit of the lower portion 17 of the container 11 is defined by a condensing screen 33 which extends transversely across the open width of the container, as shown. The lower portion 17 functions as a condensing and settling zone wherein the fuel oil is maintained at a relatively low level of turbulence to permit liquid and solid impurities which are heavier than the fuel oil to settle out prior to filtration. The distributor holes 24 distribute the incoming fuel oil transversely within the lower portion 17 to minimize vertical currents which would interfere with the settling process. The condensing screen 33 is preferably of 14 to 18 mesh which will screen out any large impurities suspended in the fuel oil. In addition, the condensing screen inhibits the passage of water entrained in the fuel oil. Water bubbles tend to join together along the underside of the screen 33 to form larger water bubbles, which, being heavier than the fuel oil, gravitate to the bottom of the container 11 with the larger solid impurities 45, as shown by the lower directional arrows in the drawing.

Accumulated water in the bottom of the container can be drained off separately from time to time by means of drain petcock 46 located at the bottom end 13 of the container 11, with minimal loss of fuel oil. Accumulated solid impurities which do not readily drain off may be cleaned out by draining the filter assembly and removing the inside elements to expose the bottom end 13 of the container.

The condensing screen 33 is supported within the container by a support flange 32 extending radially from the outlet pipe 27. The outlet pipe extends axially through the container 11 for its entire length and is the supporting member for most of the interior elements. The outlet pipe 27 extends through the bottom 13 of the container in fluid-tight relation and is secured thereto by lower retaining nut 30 threadedly engaged on the lower end of the outlet pipe. The threaded upper end of the outlet pipe 27 extends through the container cover 14, which is secured against the container side wall 12 and the sealing O-ring 15 by means of upper closure nut 31. The outlet pipe has a outlet hole 28 through which fuel oil is received into the outlet pipe 27 for discharge from the filter assembly.

The fuel oil is drawn upwardly within the container 11 as shown by the directional arrows through the filter element 35, which is supported at the mid-portion 18 of the container in slidable relation between the perforated support plate 34 and the perforated pressure plate 42. The perforated support plate 34 is supported on the outlet pipe 27 immediately above the condensing screen 33 and extends transversely across the container 11 for its entire width. The support plate 34 is preferably constructed of wide mesh material such as flattened expanded metal, and should be of sufficient strength to support the filter element within the container, while offering minimal obstruction to the flow of fuel oil.

The filter element 35 is preferably comprised of multilayered paper material, but may be made of any fibrous material capable of filtering suspended impurities from fuel oil without breakdown during extended use. As the fuel oil is continuously drawn upwardly through the filter element 35 during engine operation, the impurities suspended in the fuel oil are separated and retained within the filter element. The filtered fuel oil then passes out of the filter element through the perforated pressure plate 42 into the upper portion 19 of the container 11, as shown by the directional arrows. It then passes into the outlet pipe 27 through outlet hole 28 for discharge from the filter assembly 10. The filter element 35 must be periodically replaced as a matter of normal maintenance to prevent the accumulation of impurities within the filter to the point where the filter is no longer effective for removing and retaining impurities, or the flow of liquid through the filter is impeded such that it will not meet the maximum requirements of the engine.

A tapered bypass seat 36 extends around the outlet pipe 27 in fluid-tight relation immediately above the lower perforated support plate 34. A bypass tube 37 encompasses the outlet pipe 27 in spaced relation to define a bypass passage 40 between the bypass tube and the outlet pipe which is in communication with the outlet hole 28 in the outlet pipe through the perforated pressure plate 42. The lower end 39 of the bypass tube 37 is normally engaged against the bypass seat 36 in fluid-tight relation to prevent unfiltered fuel oil from entering the bypass passage 40 directly from the lower portion 17 of the container. The upper flanged end 38 of the bypass tube engages the underside of the perforated pressure plate 42, and is in turn engaged on its lower side by the filter element 35, which extends transversely between engagement with the side wall 12 of the container and engagement with the outer surface of the bypass tube 37.

The perforated pressure plate 42 is part of pressure plate assembly 41, which biases the bypass tube against the bypass seat 36 in fluid-tight relation. The pressure plate assembly 41 additionally includes the compression spring 43 and the pressure nut 44 which is threadedly engaged on the outlet pipe 27 within the upper portion 19 of the container 11. The compression spring 43 is of sufficient strength to maintain the filter element 35 and bypass tube 37 in their normal operating positions illustrated in the drawing and described above, under normal operating conditions.

In the event that the filter element 35 is not replaced as required, it may accumulate impurities filtered from the fuel oil until it is substantially clogged to the extent that the flow of fuel oil through the filter element 35 does not meet the requirements of the engine. Under such conditions, the operating vacuum in the outlet pipe 27 causing a fluid pressure differential across the filter element 35 and upper portion 19 of the container 11 will increase, which will exert an upward force on the filter element 35. When the upward force exceeds the downward force of the compression spring 43, the filter element 35 and the engaged bypass tube 37 will be displaced upwardly to move the bypass tube lower end 39 off the bypass seat 36 and permit fuel oil to pass upwardly from the container lower portion 17 through the bypass passage 40 and perforated pressure plate 42 to the container upper portion 17, where it flows into the outlet pipe 27 to meet the needs of the engine. Although such bypass fuel does not pass through the filter element, water and larger solid impurities will have been removed from the fuel in the lower condensing and settling zone.

The force exerted on the filter element 35 by the pressure plate assembly 41 should be sufficient to maintain the filter element in its normal operating position during normal operating conditions, but should permit bypass of the filter in the event that the flow rate through the filter element is reduced below the predetermined requirements of the associated engine. I have found that in a diesel truck fuel line bypass should occur when the vacuum in the upper portion 19 of the container exceeds the normal operating range by approximately 2 pounds per square inch. Accordingly, a pressure plate force of approximately two pounds per square inch of filter element cross-sectional area will cause the clogged filter element to be automatically bypassed when the fluid pressure differential across the filter element exceeds 2 psi. A vacuum gage 47 may be employed to indicate to the operator the level of partial vacuum in the upper portion of the container 11. In the example given, when the filter element is functioning normally, the operating range will be between —½ psi and —2 psi gage pressure. If the reading increases to —4 psi, that will be an indication that the filter assembly 10 is operating in a bypass condition, and that the filter element needs replacement.

The side wall of the container as shown in the drawing may be fabricated of either metal or transparent plastic. A transparent side wall permits inspection of the interior of the container at all times and greatly facilitates servicing of the unit. In addition, the transparent side wall permits observation of water and sludge accumulation at the bottom of the container, thereby enabling the operator to easily determine when drainage is required. If an opaque side wall is used, the drain petcock 46 may be replaced by a transparent sediment bulb or chamber (not shown) for the purpose of visually determining the amount of water and solid impurities separated within the lower portion 17 of the container 11. Such a sediment bulb can be drained and replaced in a conventional manner.

It is understood that my invention is not confined to the particular construction and arrangement of parts herein illustrated and described, but embraces all such modified forms thereof as come within the scope of the following claims.

I claim:

1. A liquid filter assembly comprising:
   a. a container having a side wall, a lower portion and an upper portion,
   b. inlet means for supplying liquid to the lower portion of the container,
   c. an outlet pipe extending vertically through said container for discharge of liquid from said container, said outlet pipe having at least one outlet hole in communication with the upper portion of said container,
   d. a bypass seat supported on said outlet pipe in fluid-tight relation,
   e. a bypass tube encompassing said outlet pipe in spaced relation to define an annular bypass passage between said outlet pipe and said bypass tube in communication with said outlet hole,
   f. means for normally biasing the lower end of said bypass tube against said bypass seat in fluid-tight relation,
   g. a filter element extending annularly between said bypass tube and said side wall for filtering liquid flowing upwardly from the lower portion to the upper portion of said container, and
   h. said filter element engaging the bypass tube whereby a predetermined fluid pressure differential across said filter element caused by the accumulation of impurities within said filter element will force said filter element upwardly to move said bypass tube off said bypass seat thereby permitting liquid to bypass said filter by flowing through said bypass passage and said outlet hole into said outlet pipe.

2. The filter assembly of claim 1 wherein the inlet means includes means for transversely dispersing the incoming liquid into the lower portion of the container to facilitate condensation and settling of impurities from the liquid within said lower portion before passage of said liquid through the filter element.

3. The filter assembly of claim 1 wherein the inlet means includes check means for preventing liquid from back-flowing out of the container through said inlet means.

4. The filter assembly of claim 1 wherein the filter element is supported in the desired position within the container by a lower perforated plate, and wherein the means for biasing said bypass tube includes an upper perforated plate which engages the upper end of said tube and the upper end of said filter element, and a compression spring which is compressed downwardly against said upper perforated plate.

5. The filter assembly of claim 4 wherein the outlet pipe extends through the lower end of the container in fluid-tight relation to discharge liquid therethrough, and wherein a cover is removably secured to the side wall of the container in fluid-tight relation by fastener means secured to the upper end of said outlet pipe.

6. The filter assembly of claim 1 wherein at least a portion of the container side wall is transparent to permit inspection of the interior of the container during operation, and wherein drain means depend from the lower end of the container to permit removal of impurities which have settled to the bottom of the container.

7. A liquid filter assembly comprising:
   a. a container,
   b. inlet means for supplying liquid to be filtered to said container,
   c. an outlet pipe extending vertically through said container for discharge of liquid from said container, said outlet pipe having at least one outlet hole,
   d. a filter element slidably engaged within said container for filtering liquid flowing from said inlet means to the outlet hole of said outlet pipe,
   e. a bypass tube engaging said filter element and encompassing said outlet pipe to define a bypass passage between said outlet pipe and said bypass tube in communication with said outlet hole,
   f. bypass seat means mounted on said outlet pipe for receiving the lower end of said bypass tube in fluid-tight relation, g. means for biasing said bypass tube toward a normal position wherein said bypass tube is engaged against said bypass seat, and for permitting said bypass tube to disengage from said bypass seat to allow liquid to bypass the filter element through said bypass passage and said outlet hole when liquid flow through said filter element is restricted by the accumulation of impurities within the filter element causing the fluid pressure differential on opposite sides of said filter element to be increased above a predetermined level.

8. The filter assembly of claim 7 wherein the biasing means includes a perforated pressure plate extending transversely across the interior of the container in engagement with the upper ends of the bypass tube and the filter element, and a compression spring engaged against the upper surface of said pressure plate, said spring applying a downward force against said pressure plate substantially equal to the upward force exerted on said filter element when the fluid pressure differential across said filter element reaches said predetermined level.

* * * * *